United States Patent
Hill

(10) Patent No.: US 6,434,885 B1
(45) Date of Patent: Aug. 20, 2002

(54) MOVEABLE WINDOW UNIT HAVING A NOISE REDUCTION SYSTEM

(75) Inventor: Alistair Hill, Hildesheim (DE)

(73) Assignee: Meteor Gummiwerke K.H. Bädje GmbH & Co., Bockenem (DE)

( * ) Notice: Subject to any disclaimer, the term of this patent is extended or adjusted under 35 U.S.C. 154(b) by 0 days.

(21) Appl. No.: 09/355,603

(22) PCT Filed: Nov. 2, 1998

(86) PCT No.: PCT/EP98/06926

§ 371 (c)(1),
(2), (4) Date: Jul. 30, 1999

(87) PCT Pub. No.: WO99/28583

PCT Pub. Date: Jun. 10, 1999

(30) Foreign Application Priority Data

Dec. 1, 1997 (DE) .......................................... 297 21 054

(51) Int. Cl.⁷ .............................................. E05F 15/16
(52) U.S. Cl. ............................ 49/138; 49/349; 318/268
(58) Field of Search ........................... 49/31, 138, 348, 49/349, 350, 351; 318/268, 271

(56) References Cited

U.S. PATENT DOCUMENTS

| | | | |
|---|---|---|---|
| 2,619,939 A | * 12/1952 | Oishei et al. ................. | 91/396 |
| 3,833,843 A | * 9/1974 | Bossons ........................ | 318/11 |
| 4,328,451 A | * 5/1982 | Barge .......................... | 318/596 |
| 4,998,379 A | * 3/1991 | Yamada et al. ................ | 49/138 |
| 5,085,004 A | * 2/1992 | Beauprez ...................... | 49/138 |
| 5,126,642 A | * 6/1992 | Shahrodi ...................... | 318/433 |
| 5,138,182 A | * 8/1992 | Kokubu ........................ | 307/10.1 |
| 5,142,824 A | * 9/1992 | Le Compagnon et al. .... | 49/349 |
| 5,349,276 A | * 9/1994 | Mezzatesta et al. ......... | 318/268 |
| 5,351,439 A | * 10/1994 | Takeda et al. ................ | 49/28 |
| 5,483,135 A | * 1/1996 | Parks .......................... | 318/469 |
| 5,488,276 A | * 1/1996 | Nishibe ........................ | 318/473 |
| 5,552,685 A | * 9/1996 | Young et al. ................. | 318/254 |
| 5,606,826 A | * 3/1997 | Calhoun ....................... | 49/138 |
| 5,714,853 A | * 2/1998 | Knab et al. ................... | 318/256 |
| 5,780,984 A | * 7/1998 | Miyako et al. .............. | 318/268 |
| 5,841,621 A | * 11/1998 | Dean et al. ................... | 361/185 |
| 6,133,699 A | * 10/2000 | Vrionis et al. ................ | 318/34 |
| 6,208,102 B1 | * 3/2001 | Kikuchi et al. .............. | 318/466 |

FOREIGN PATENT DOCUMENTS

| | | |
|---|---|---|
| GB | 2 268 287 | 1/1994 |
| GB | 2 288 036 | 10/1995 |
| GB | 2 289 351 | 11/1995 |
| WO | WO 97/12775 | 4/1997 |

* cited by examiner

*Primary Examiner*—Gregory J. Strimbu
(74) *Attorney, Agent, or Firm*—Synnestvedt & Lechner LLP

(57) ABSTRACT

A movable window unit having a window glass which can be moved between a closed end position in a well of a door and an open end position by a motorized drive. The motorized drive comprises an electric motor which is controlled by a motor control. To reduce undesirable noises which may arise during the movement of the window glass, the motor is operated by the motor control to repeatedly vary the speed of displacement of the window glass.

17 Claims, 4 Drawing Sheets

MOVEABLE WINDOW UNIT HAVING A NOISE REDUCTION SYSTEM

BACKGROUND OF THE INVENTION

This invention relates to a movable window unit comprising a window glass which can be lowered into a well of a panel member, as well as a motor control for an electric window-raising motor.

Practical examples are known of movable window units in the form of passenger car doors in which a window glass can be lowered into a well of a panel member. The window glass is guided in relation to the panel member by means of guide members and can be displaced by means of a motorized drive between an open end position and a closed end position. In order to guide the window glass, well seals are used in addition to three-dimensional guide rails which embrace the window glass at its side edges.

Practice has shown that, during the displacement of the window glass by means of the motorized drive, undesirable noises arise, depending upon the ambient temperature and the moisture on the glass in the region of the well seals. In order to eliminate these noises, well seals with surface coatings have been developed. In German Utility Model (Gebrauchsmuster) DE 295 15 597 U1 there has been described the phenomenon which supposedly causes this noise, which is referred to as the slip-stick effect. Additionally, in German Utility Model (Gebrauchsmuster) DE 295 15 597 U1, various overlays have been described for noise reduction during the displacement of the window glass.

It has been shown however that the known anti-squeaking overlays cannot prevent the generation of noise to the desired degree in all cases. It is therefore the object of the invention further to reduce the generation of noise during the displacement of a window glass of a movable window unit.

SUMMARY OF THE INVENTION

The invention concerns a window unit comprising a window glass which can be lowered into a well of a panel member, the window glass being guided relative to the panel member by means of guide members and being displaceable by means of a motorized drive between an open end position and a closed end position.

According to the invention, the motorized drive can be actuated to operate in a non-uniform mode in which the speed of displacement of the window glass is varied in a translocation phase after conclusion of a start-up phase. This is achieved preferably by means of an inventive motor control for an electric window-raising motor, which comprises a control module which drives the electric window-raising motor non-uniformly in the activated state. By virtue of the non-uniform movement of the window glass, the generation of noise during the displacement is considerably reduced. Alternatively, the non-uniform movement of the glass via the motorized drive can be produced in the non-uniform mode by means of a gear system.

Preferably, an electric motor is provided as the motorized drive in a movable window unit according to the invention. An electric motor offers the advantage of easy controllability. In a control system provided in such a case, the control module for the non-uniform mode of operation can be integrated in a common integrated circuit with a module for the short stroke movement of the glass for the opening and closing of the door.

According to a preferred embodiment of the invention, in the non-uniform mode, the motorized drive is switched back and forth between a first, upper speed of rotation and a second, lower speed of rotation. Such switching back and forth can be effected with simple means in terms of technical control.

As a preferred alternative to this switching back and forth between two speeds of rotation, one can, in accordance with a further preferred embodiment of the invention, arrange that the motorized drive comprises a preferably electronic drive control means which imposes on a basic speed of rotation of an electric motor a rotational component having substantially sinusoidal character. With such a drive control means the motor noises are reduced and the visual perception of the non-uniform motion of the window glass is made less noticeable.

Since it is conceivable that users of a movable window unit in accordance with the invention could misunderstand the non-uniform motion of the window glass as being an operational failure, there is provision for activating the non-uniform mode of operation only if an undesirable amount of noise is feared. In order to achieve this, the movable window unit can be provided with a sensor device which determines the moment of resistance which opposes the motorized drive during the displacement of the window glass. By evaluation of the measured values from this sensor device in an activating device the non-uniform mode of operation of the motorized drive can be activated.

If an electric motor is provided for the motorized drive, then preferably in order to determine the moment of resistance which opposes the electric motor during the displacement of the window glass, measuring transformers monitoring the power consumption of the electric motor are provided, the output signals from which are fed to an activating device which activates the non-uniform mode of operation.

Further advantageous features and embodiments of the invention are set out in the subsidiary claims as well as in the following description which is to be read in conjunction with the drawings.

DETAILED DESCRIPTION OF THE PREFERRED EMBODIMENTS

Figure 1:
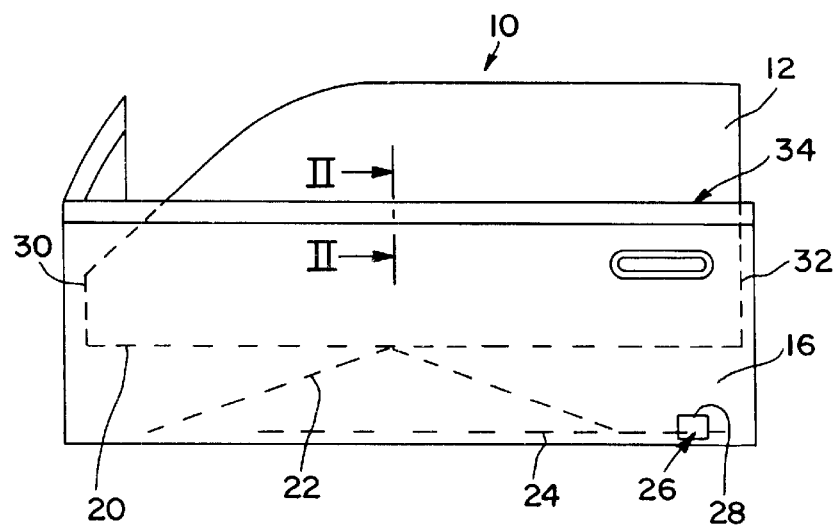
FIG. 1 shows a movable window unit in accordance with the invention fitted as the door of a convertible and having a well seal guiding a window glass.
Figure 2:
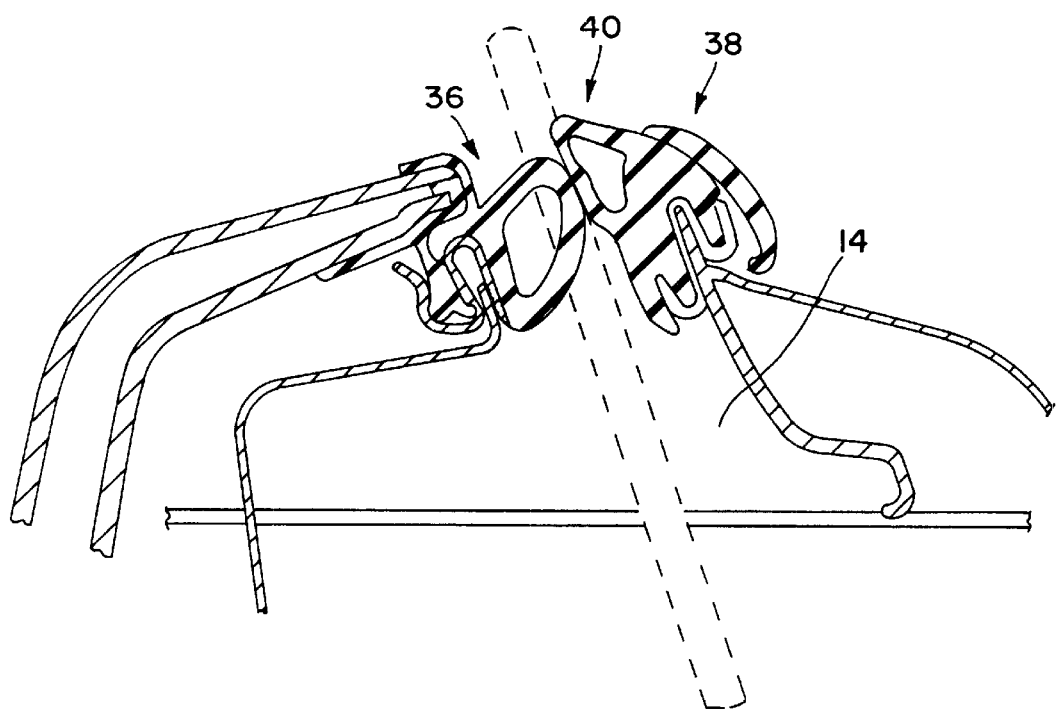
FIG. 2 is a section through the door of the convertible in the region of the well seal, taken along the line II—II in FIG. 1.

The convertible door 10 shown in FIG. 1 comprises a three-dimensional curved window glass 12 which can be lowered into a well 14 of a panel member 16 forming the door 10. For the raising and lowering of the window glass there is provided within the panel member 16 a scissors structure 22 which grips the lower edge 20 of the window glass. This scissors structure is driven via a spindle 24 from an electric motor 28 which is provided as motorized drive 26. The window glass 12 is held at its front and rear edges 30, 32 within the panel member 16 by guide rails (not shown) and in the region of the upper edge 34 of the panel member 16 by means of a guiding well seal 40 which comprises an inner sealing element 36 and an outer sealing element 38. The inner sealing element 36 is a sinter-coated polyamide window guide profile of EPDM soft rubber of 60 Shore A hardness with a profiled steel strip insert to give it rigidity in the fitting region. The outer sealing element 38 is a flocked window guide profile duplexed with a steel wire reinforcement of EPDM of 50 to 90 Shore A hardness. Details of the well seal are to be found in the article "Elastomer Seal Systems in Motor Vehicle Bodywork" in the journal "Kautschuk+Gummi. Kunststoff" January 1991.

Figure 3:
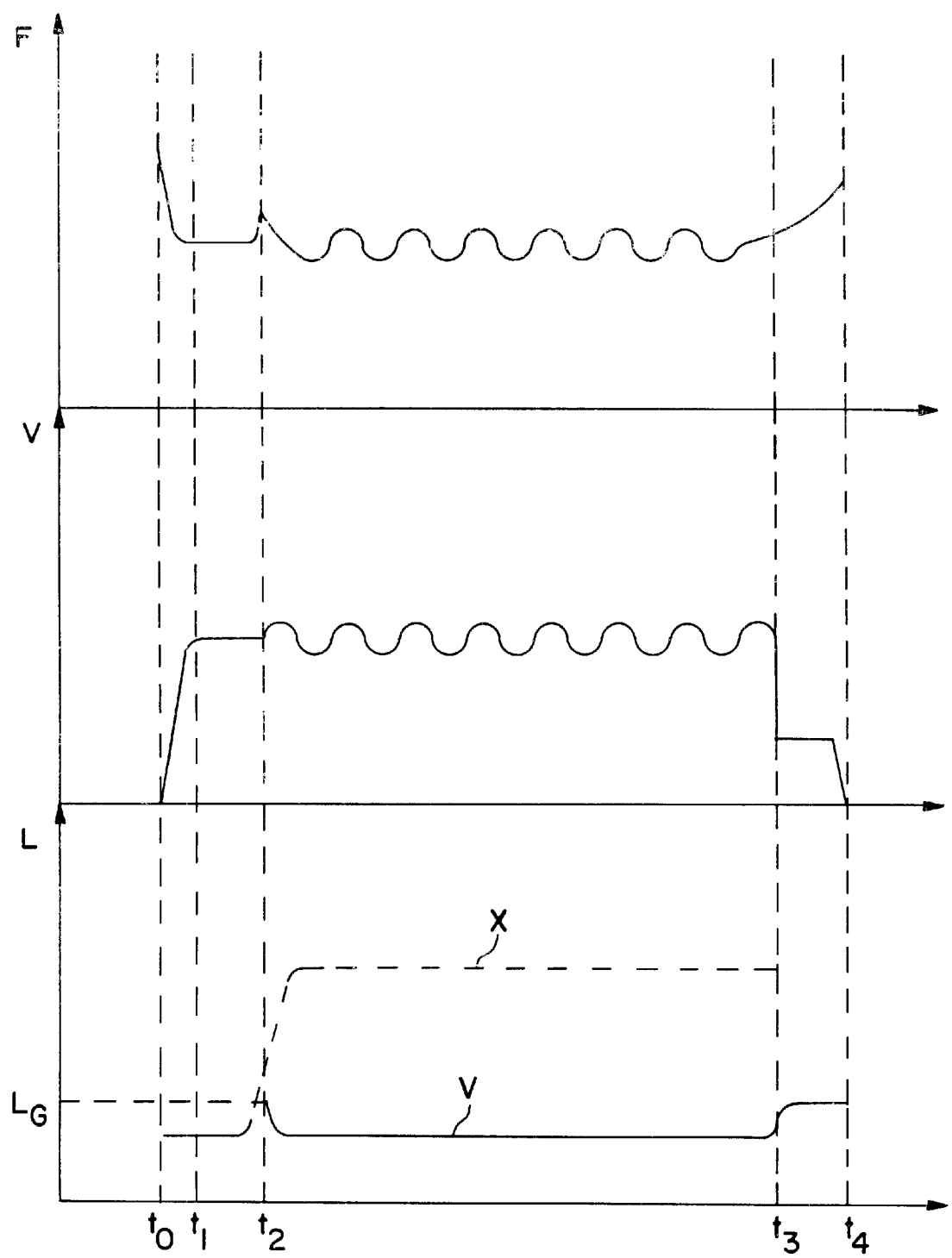
FIG. 3 is a diagram graphically showing the force, the speed and the amount of noise during the closure of a window by displacement of the window glass.

During the closing of a window, i.e. during the raising of the window glass 12 from the panel member 16, the forces F, speeds V and noise L which are shown in FIG. 3 occur. In the diagram the following points in time are indicated by t:

$t_0$ Beginning of the closing process $t_1$ Conclusion of the start-up phase $t_2$ Exceeding of a threshold $L_G$ and activation of the non-uniform mode of operation $t_3$ Beginning of the pressure phase $t_4$ Window closed While during the closure of a window by means of an electric motor according to the prior art under unfavourable conditions the noise curve shown in broken lines in FIG. 3 and indicated by X can occur, by using the non-uniform mode of operation provided according to the invention, which is activated at point $t_2$ and is switched off at point $t_3$, a noise reduction is achieved which is represented by the noise curve V in FIG. 3. The non-uniform mode of operation shown in FIG. 3 is characterised by a basic speed with a superimposed sinusoidal component.

Figure 4:
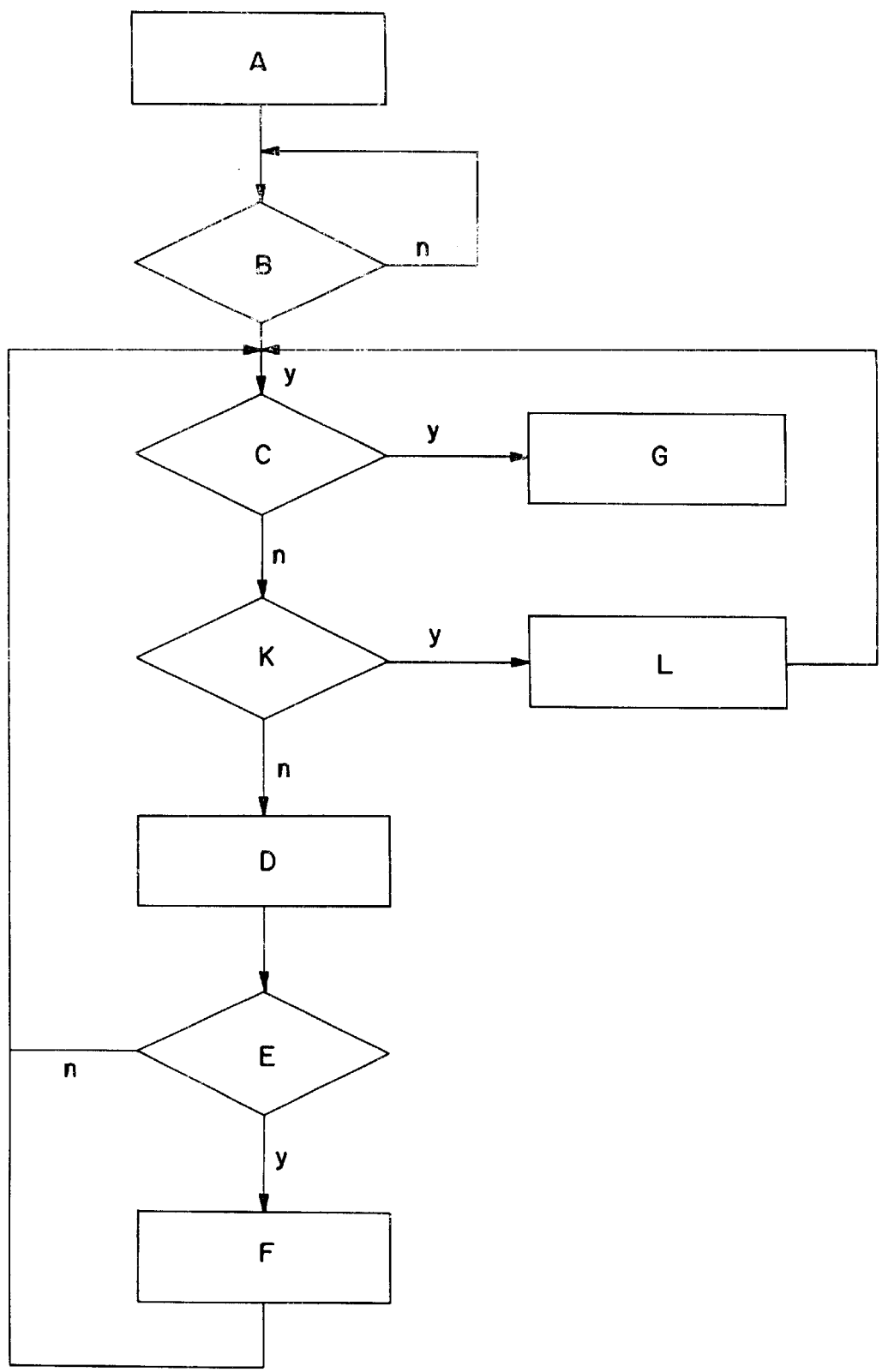
FIG. 4 is a flow diagram to illustrate the control processes in the closing of a window by displacement of the window glass.

The flow diagram shown in FIG. 4 serves to illustrate the control processes during the closure of the window. First, in step A, an operator switches on by means of a switch and a control for the electric motor 28. Simultaneously, a time switch is actuated, in order to keep the control system for the non-uniform mode of operation inactive during the start-up phase between the time points $t_0$ and $t_1$. After it has been established in step B that the start-up phase has been completed, in step C it is examined whether the glass has already moved to its end position. For this, an end position switch is interrogated and in the case that the glass is found to be in the end position then the motor is switched off in step G. If the glass is found not to have reached its end position, then in step K it is questioned whether the glass is yet located in approximation to a lateral roof frame seal. If this is the case, then the motor is switched in step L into a slow-running mode. If this is not the case, then in step D the moment of resistance braking the electric motor 28 is determined. If in step E it is established that the moment of resistance does not exceed a threshold value then the control returns to step C. If a predetermined threshold value is exceeded, then in step F the non-uniform mode of operation is activated and the control returns finally to step C.

Figure 5:
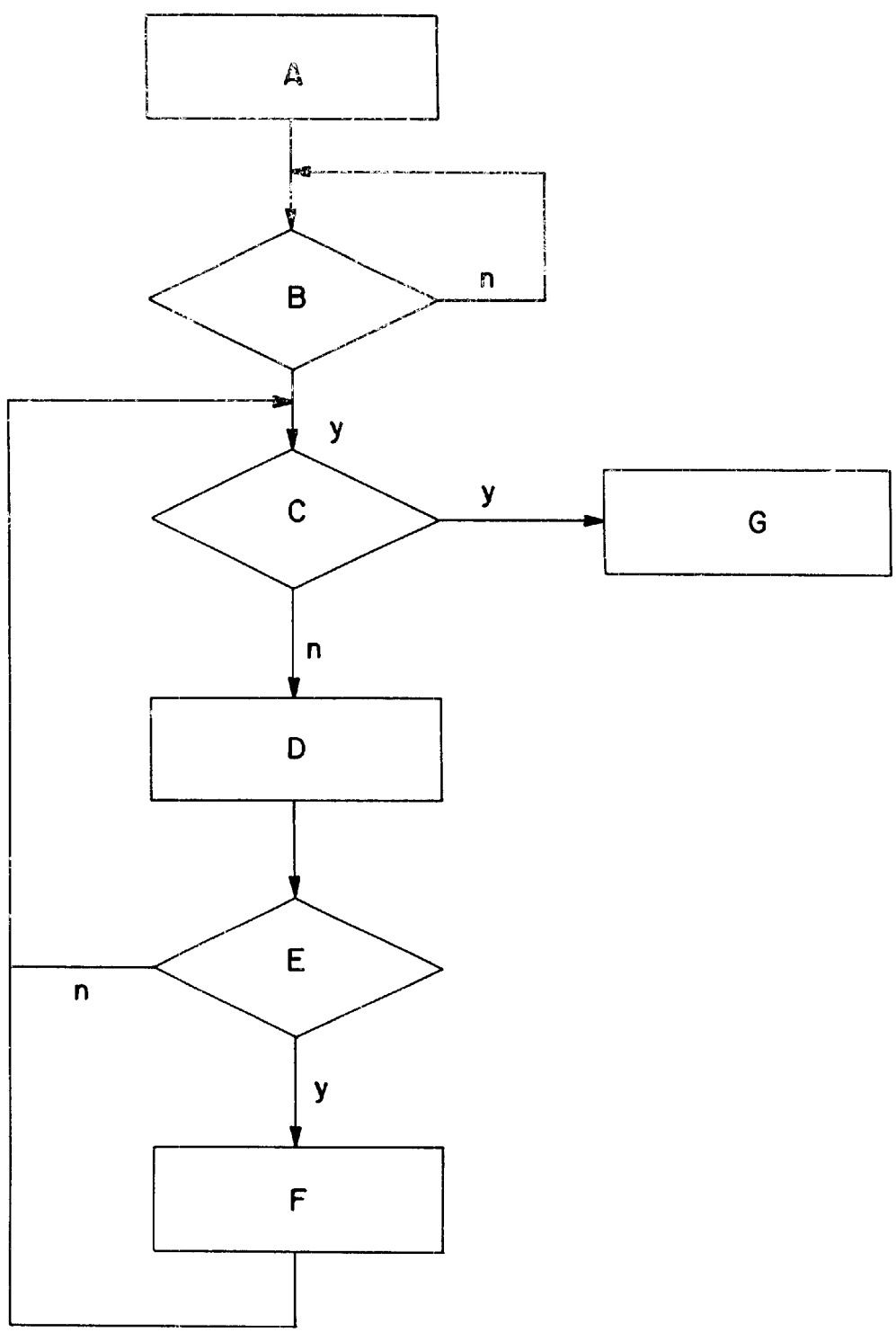
FIG. 5 is a flow diagram to illustrate the control processes during the opening of a window by displacement of the window glass.

The control processes represented in the flow diagram of FIG. 5, for the opening of a window, correspond substantially to the control processes which have already been described above in connection with the flow diagram for the closure of the window in FIG. 4. For this, the same control steps are indicated by the respective same reference letters. Reference should also be made in connection with this to the corresponding description in connection with the flow diagram of FIG. 4. It is important in connection with this to appreciate that the control processes upon opening differ from those upon closing only in that the steps K and L are omitted during opening, since a braking of the glass before reaching the lower end position is not necessary.

What is claimed is:

1. A window unit comprising:
    a window glass movable at a varying speed between an open end position and a closed end position;
    a panel member having a well, said window glass being lowerable into said well;
    a motorized drive for moving said window glass between said open end and closed end positions, movement of said window glass comprising a start-up phase and a translocation phase after the start-up phase, said motorized drive having a non-uniform mode of operation wherein the speed of said window glass is repeatedly varied in said translocation phase between a lower speed and a higher speed.

2. A window unit in accordance with claim 1, wherein said motorized drive comprises an electric motor having a variable rotational speed.

3. A window unit in accordance with claim 2, further comprising at least one measuring transformer configured to monitor a power consumption of said electric motor for determining a resistance torque which counteracts said motorized drive upon movement of said window glass, and an activating device which activates said non-uniform mode of operation, said activating device being in communication with said measuring transformer to receive output signals therefrom.

4. A window unit in accordance with claim 2, wherein said motorized drive includes an electronic drive control that switches the rotational speed of said electric motor back and forth between a higher speed and a lower speed.

5. A window unit in accordance with claim 4, further comprising at least one measuring transformer configured to monitor a power consumption of said electric motor for determining a resistance torque which counteracts said motorized drive upon movement of said window glass, and an activating device which activates said non-uniform mode of operation, said activating device being in communication with said measuring transformer to receive output signals therefrom.

6. A window unit in accordance with claim 2, wherein said motorized drive includes an electronic drive control that varies the rotational speed of said electric motor between a higher and a lower speed in a substantially sinusoidal manner, thereby repeatedly varying said speed of said window glass.

7. A window unit in accordance with claim 6, further comprising at least one measuring transformer configured to monitor a power consumption of said electric motor for determining a resistance torque which counteracts said motorized drive upon movement of said window glass, and an activating device which activates said non-uniform mode of operation, said activating device being in communication with said measuring transformer to receive output signals therefrom.

8. A window unit in accordance with claim 1, further comprising a sensor device for determining a resistance torque which counteracts said motorized drive upon movement of said window glass, and an activating device which activates said non-uniform mode of operation of said motorized drive, said activating device being in communication with said sensor device to receive output signals therefrom.

9. A window unit in accordance with claim 1 further comprising a guiding elastic rubber well seal, said well seal having an anti-squeaking overlay.

10. A window unit in accordance with claim 1 wherein said panel member is a door of a convertible vehicle.

11. A method of reducing noise during movement of a movable window unit, said unit having a window glass and a motorized drive for moving said window glass at a varying speed between an open end and a closed end position, said method comprising the steps of:

(a) actuating said motorized drive to move said window glass; and (b) repeatedly varying the speed of said window glass between a higher and a lower speed by controlling said motorized drive as said window glass moves between said open end and closed end positions.

12. A method in accordance with claim 11, wherein said motorized drive comprises an electric motor and said step (b) further comprises varying a speed of rotation of said electric motor between a higher and a lower speed.

13. A method in accordance with claim 12, wherein said speed of rotation of said electric motor is varied between said higher speed and said lower speed in a substantially sinusoidal manner.

14. A method in accordance with claim 11, wherein the movement of said window glass comprises a start-up phase whereby said window glass begins moving, and a translocation phase between said start-up phase and as end position of said window glass, and wherein the step (b) takes place during said translocation phase.

15. A method in accordance with claim 14, wherein the speed of said window glass is adapted to be repeatedly varied between said higher and lower speeds during the entire translocation phase.

16. A method in accordance with claim 11, further comprising determining a resistance torque which counteracts said motorized drive upon movement of said window glass, the step (b) taking place upon said resistance torque reaching a threshold value.

17. A method in accordance with claim 16, further comprising monitoring a power consumption of said motorized drive.

* * * * *